US008985915B2

(12) United States Patent
Ishi (10) Patent No.: US 8,985,915 B2
(45) Date of Patent: Mar. 24, 2015

(54) CUTTING INSERT, CUTTING TOOL, AND METHOD OF MANUFACTURING MACHINED PRODUCT USING THE SAME

(75) Inventor: Hirohisa Ishi, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 678 days.

(21) Appl. No.: 13/318,305

(22) PCT Filed: May 27, 2010

(86) PCT No.: PCT/JP2010/059028
§ 371 (c)(1),
(2), (4) Date: Oct. 31, 2011

(87) PCT Pub. No.: WO2010/137663
PCT Pub. Date: Dec. 2, 2010

(65) Prior Publication Data
US 2012/0045289 A1 Feb. 23, 2012

(30) Foreign Application Priority Data

May 28, 2009 (JP) .................. 2009-129337
Jul. 30, 2009 (JP) .................. 2009-177721
Jul. 30, 2009 (JP) .................. 2009-177722

(51) Int. Cl.
*B23C 5/20* (2006.01)
*B23C 5/06* (2006.01)

(52) U.S. Cl.
CPC . *B23C 5/06* (2013.01); *B23C 5/202* (2013.01); *B23C 2200/0444* (2013.01); *B23C 2200/087* (2013.01); *B23C 2200/203* (2013.01); *B23C 2200/208* (2013.01)
USPC ........................................... 407/42; 407/113

(58) Field of Classification Search
CPC ............... B23C 2200/0444; B23C 2200/0405; B23C 2200/208; B23C 2200/203; B23C 2200/086; B23C 2200/087; B23C 2200/083; B23C 2200/326
USPC ................................ 407/34, 42, 61, 113, 116
See application file for complete search history.

(56) References Cited

U.S. PATENT DOCUMENTS 5,454,670 A * 10/1995 Noda et al. .................. 407/42
5,947,650 A    9/1999 Satran et al.

(Continued)

FOREIGN PATENT DOCUMENTS

EP        577011 A1 *  1/1994  ............... B23C 5/20
JP    61-214909 A  *  9/1986  ............... B23C 5/20

(Continued)

*Primary Examiner* — Daniel Howell
*Assistant Examiner* — Ryan Rufo
(74) *Attorney, Agent, or Firm* — Volpe and Koenig, P.C.

(57) ABSTRACT

A cutting insert having excellent chip discharge performance is provided. The cutting insert (1) according to an embodiment of the present invention includes an upper surface (2), a lower surface (3), a side surface (4) connected to the upper surface (2) and the lower surface (3), and a cutting edge (5) which is located at an intersection of the upper surface (2) and the side surface (4), and includes a major cutting edge (51) and a flat cutting edge (52). The major cutting edge (51) includes a major cutting section (512) which has a concave shape and is inclined downward as a straight line connecting both ends thereof is away from the flat cutting edge (52) in a side view. A cutting tool (11) according to an embodiment of the present invention includes the cutting insert (1) and a holder (10) configured to attach the cutting insert (1) thereto.

19 Claims, 9 Drawing Sheets

(56) References Cited

U.S. PATENT DOCUMENTS

| | | | |
|---|---|---|---|
| 5,951,214 | A | 9/1999 | Rothballer et al. |
| 6,336,776 | B1* | 1/2002 | Noggle ............... 407/34 |
| 6,530,726 | B2 | 3/2003 | Nelson |
| 6,543,970 | B1 | 4/2003 | Qvarth et al. |
| 7,976,250 | B2* | 7/2011 | Fang et al. ............ 407/113 |
| 8,113,746 | B2* | 2/2012 | Koga ................. 407/113 |
| 2002/0146293 | A1 | 10/2002 | Nelson |
| 2007/0003384 | A1 | 1/2007 | Smilovici et al. |
| 2007/0071559 | A1* | 3/2007 | Koskinen ............. 407/34 |
| 2007/0183858 | A1* | 8/2007 | Blomstedt ........... 407/113 |
| 2008/0232912 | A1* | 9/2008 | Bhagath ............. 407/114 |
| 2009/0285646 | A1* | 11/2009 | Oprasic et al. ........ 407/114 |
| 2010/0034602 | A1 | 2/2010 | Sung et al. |
| 2010/0221076 | A1* | 9/2010 | Takahashi et al. ...... 407/42 |
| 2011/0305534 | A1* | 12/2011 | Park et al. ........... 407/100 |
| 2012/0070242 | A1* | 3/2012 | Choi et al. ........... 407/113 |
| 2012/0093595 | A1* | 4/2012 | Choi ................. 407/49 |

FOREIGN PATENT DOCUMENTS

| | | | | |
|---|---|---|---|---|
| JP | 08-174327 | A * | 7/1996 | ........ B23C 5/20 |
| JP | 08-243829 | A * | 9/1996 | ........ B23C 5/20 |
| JP | 08-323510 | A * | 12/1996 | ........ B23B 27/22 |
| JP | 2001-157904 | A | 6/2001 | |
| JP | 2004-524176 | A | 8/2004 | |
| WO | 01/28722 | A1 | 4/2001 | |
| WO | 2008078892 | | 7/2008 | |

* cited by examiner

CUTTING INSERT, CUTTING TOOL, AND METHOD OF MANUFACTURING MACHINED PRODUCT USING THE SAME

TECHNICAL FIELD

The present invention relates to a cutting insert, a cutting tool, and a method of manufacturing a machined product by using them.

BACKGROUND ART

Throwaway-type cutting tools, including the case of using a negative-type cutting insert, are required to improve chip discharge performance.

Patent document 1 discloses a cutting insert with an inclined linear major cutting edge, and also discloses a cutting tool configured so that the major cutting edge has a positive axial rake when the cutting insert is attached to a holder.

However, this cutting tool has also failed to achieve sufficient chip discharge performance. Hence, there is a need to further improve chip discharge performance.

PRIOR ART DOCUMENT

Patent Document

Patent Document 1: Japanese Unexamined Patent Publication No. 2008-544872

SUMMARY OF THE INVENTION

Problems to be Solved by the Invention

An object of the present invention is to provide a cutting insert, particularly a negative-type cutting insert having excellent chip discharge performance.

Means for Solving the Problems

A cutting insert according to an embodiment of the present invention includes an upper surface, a lower surface, a side surface connected to the upper surface and the lower surface, and a cutting edge which is located at an intersection of the upper surface and the side surface, and includes a major cutting edge and a flat cutting edge. The major cutting edge includes a major cutting section which has a concave shape and is inclined downward as a straight line connecting both ends thereof departs from the flat cutting edge in a side view.

A cutting tool according to an embodiment of the present invention includes the cutting insert, and a holder configured to attach the cutting insert thereto.

A method of manufacturing a machined product according to an embodiment of the present invention includes rotating the cutting tool; and bringing the cutting edge of the rotating cutting tool into contact with a surface of a workpiece.

Effect of the Invention

In the cutting insert according to the embodiment of the present invention, the major cutting section has the concave shape in the side view. This facilitates attachment of the cutting insert to the holder so that the major cutting section has the positive axial rake. This also brings the cross-sectional shape of chips into a curved shape. Further, the major cutting section is inclined downward as the straight line connecting both ends thereof departs from the flat cutting edge. Therefore, when each of the chips having the cross-sectional shape makes one full rotation while being curled, the diameter (curl diameter) thereof is minimized at one end of the major cutting section (the end portion close to the corresponding flat cutting edge). In addition to this, the chips grow overlappingly and helically at the location of the small curl diameter, so that helical bodies are less susceptible to diameter enlargement. It is therefore capable of reducing the occasions where the chips damage the workpiece or harm the insert, thereby providing excelling chip discharge performance.

BRIEF DESCRIPTION OF THE DRAWINGS

FIG. 2(*a*) is a top view of the cutting insert shown in FIG. 1; FIG. 2(*b*) is a side view thereof; FIG. 2 (*c*) is a partial enlarged view of FIG. 2(*b*);

FIG. 5 is a drawing showing a cutting insert according to a third embodiment of the present invention, specifically, FIG. 5(*a*) is a drawing in which various kinds of lines are added to FIG. 2(*a*); FIG. 5(*b*) is a sectional view taken along the line B-B therein; FIG. 5(*c*) is a sectional view taken along the line C-C therein; FIG. 5(*d*) is a sectional view taken along the line D-D therein; FIG. 5(*e*) is a sectional view taken along the line E-E therein;

FIG. 9(*a*) is a photograph substituted for drawing of chips obtained when a workpiece is cut by using the cutting tool with the cutting insert of the first embodiment attached thereto; and FIG. 9(*b*) is a photograph substituted for drawing of chips obtained when the workpiece is cut by using the cutting tool with a negative-type insert of each of comparative examples attached thereto.

PREFERRED EMBODIMENTS FOR CARRYING OUT THE INVENTION

Cutting Insert

First Embodiment

The cutting insert 1 (hereinafter referred to as "insert 1" in some cases) according to the first embodiment of the present invention is described below with reference to FIGS. 1 to 3.

Figure 1:
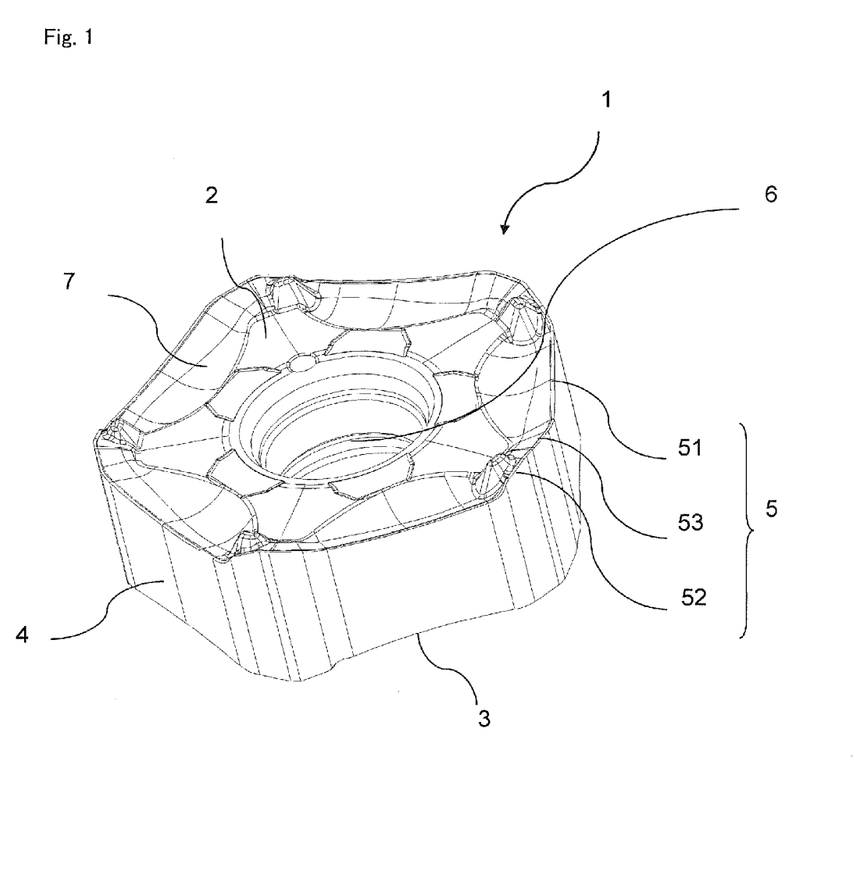
FIG. 1 is a general perspective view of a cutting insert according to an embodiment of the present invention.

Referring to FIG. 1, the insert 1 includes a body part of a substantially polygonal plate shape. No particular limitation is imposed on the body part. That is, it may have a certain shape usually employed by those skilled in the art, such as triangle, quadrangle, pentagon, hexagon, and octagon in a top view. In FIGS. 1 and 2, a substantially pentagonal shape having five long sides is employed.

The body part includes an upper surface 2 functioning as a rake face, a lower surface 3 functioning as a seating face, and a side surface 4 which is connected to the upper surface 2 and the lower surface 3, and functions as a flank face. Cutting edges 5 are respectively formed along intersections of the upper surface 2 and the side surface 4. Further, the upper surface 2 corresponding to the rake face is provided with an attachment screw contact portion 6 extended through the body part from the upper surface 2 to the lower surface 3.

In the insert 1 shown in FIG. 1, specifically, the side surface 4 is formed vertically with respect to the upper surface 2 and the lower surface 3. That is, it is a negative-type insert allowing both the upper surface 2 and the lower surface 3 to be used as the rake face. Additionally, each of the upper surface 2 and the lower surface 3 has a substantially polygonal shape, thereby allowing all the sides thereof to be used for cutting. Therefore, the insert 1 of the present embodiment performs cutting by using ten corners. In this case, the cutting edges 5 are also formed along the intersection of the lower surface 3 and the side surface 4. When the cutting edge 5 close to the lower surface is used, the lower surface 3 can be used as the rake face, and the upper surface 2 can be used as the seating face. No particular limitation is imposed on the material and dimension of the insert 1. For example, a certain material such as cemented carbide, cermet, or ceramic may be used, and the thickness thereof may be set to approximately 3-10 mm, and the inscribed circle thereof may be set to approximately φ 10-20. Alternatively, the insert 1 may be so-called positive-type insert in which a clearance angle is imparted to the side surface 4.

The cutting edges 5 formed along the intersection of the upper surface 2 and the side surface 4 include a major cutting edge 51 and a flat cutting edge 52. The major cutting edge 51, particularly a major cutting section 512 is a cutting edge that plays major role in the formation of chips during cutting operation. From the viewpoint of reducing cutting resistance, groove portions for dividing the major cutting edge 51 into a plurality of sections may be included. The flat cutting edge 52 is formed for improving surface finish of the workpiece. The major cutting edge 51 and the flat cutting edge 52 may be continuously connected to each other directly or indirectly through a minor cutting edge 53.

Figure 7:
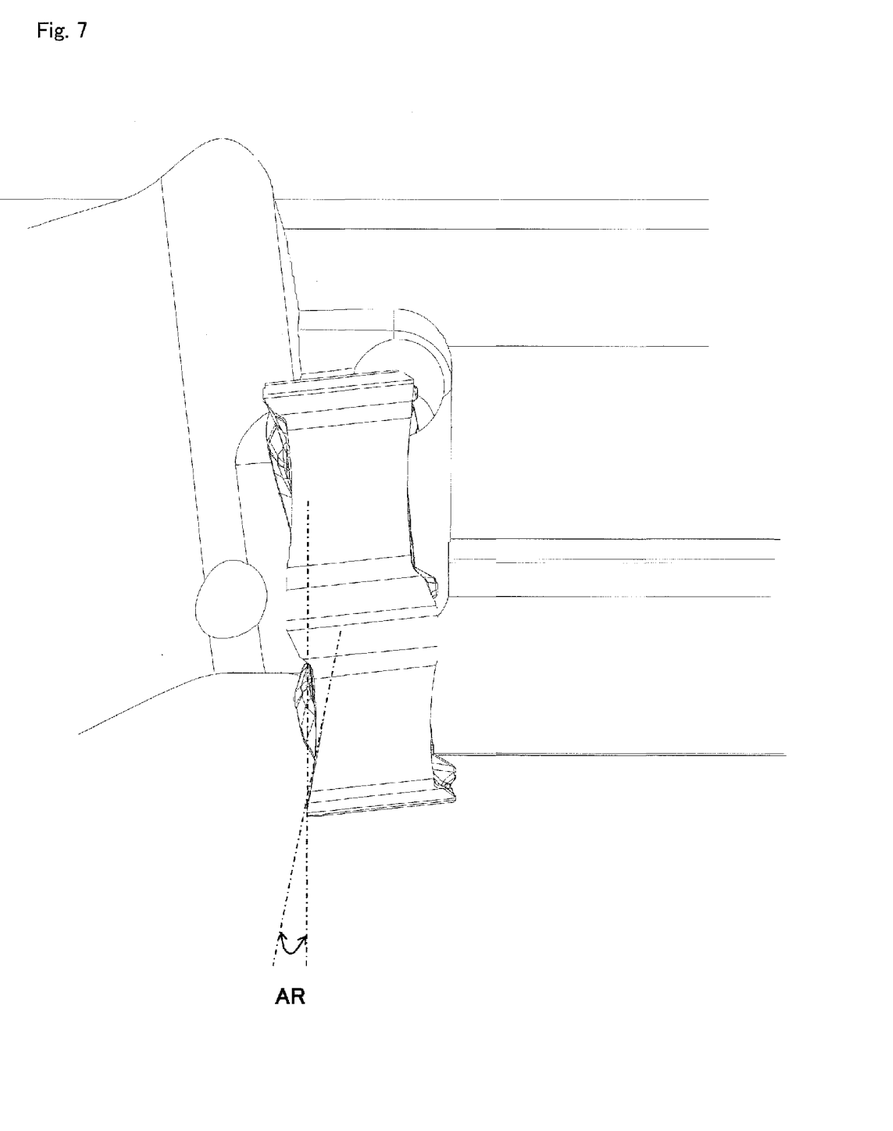
FIG. 7 is a partially enlarged view of the cutting tool in FIG. 6.

Referring to FIG. 2(b), the major cutting section 512 has a concave shape that is indented toward the lower surface 3, and a straight line connecting both ends thereof is inclined downward away from the flat cutting edge 52 in a side view. This facilitates attachment of the insert 1 to the holder so that the major cutting section 512 has the positive axial rake. For example, in the negative-type insert, in order to reduce interference between the flank face (the side surface 4) of the flat cutting edge 52 and the finished surface of the workpiece in the front end portion of the holder, the insert is attached to the holder so that the insert itself has a negative axial rake with respect to the direction of the rotation axis of the holder. In this case, the major cutting edge 51 (the major cutting section 512) also has a negative axial rake, and there is a risk that cutting resistance will be increased. Whereas in the present embodiment, the straight line connecting both ends of the major cutting section 512 is inclined as shown in FIG. 7, making it possible for the major cutting edge 51 (the major cutting section 512) to have the positive axial rake even though the insert is attached so that the insert itself has the negative axial rake. In cases where the major cutting edge 51 (the major cutting section 512) has a curved shape (arc shape), a tangent of the major cutting edge portion that plays a major role in cutting may have a positive axial rake.

No particular limitation is imposed on the shape of the major cutting section 512 as long as it has the concave shape. Only a plurality of linear portions (hereinafter referred to as major cutting edge linear portions in some cases) having a linear shape in a side view may be combined together into the concave shape. Alternatively, these linear portions and a curved portion (hereinafter referred to as major cutting edge curved portion in some cases) having a curved shape in a side view may be combined together. The feature that the entire major cutting section 512 is curvingly bent is suitable for stable curling of chips. Particularly, the chips can be further stably curled in the case of forming so that the radius of curvature increases, namely, the curvature decreases in a direction away from one end 512a of the major cutting section 512 and toward the other end 512b. The major cutting section 512 may have an arc shape. The radius of curvature can be measured by observing the side surface by using, for example, a CCD camera or an image measuring device.

When the major cutting section 512 includes the curved portion, the linear portion is preferably combined therewith from the viewpoint of the insert strength. For example, the fracture or the like of the cutting edges 5 can be reduced by applying the linear portion to the first portion to come into contact with the workpiece. For example, when the linear portion and the curved portion are arranged in the order mentioned from the end portion close to the corresponding flat cutting edge 52, the ratio of length of the linear portion and the curved portion is preferably about 1:9 to 2:8. The linear portion may be parallel to the lower surface 3 or inclined toward the lower surface 3 in a side view.

Figure 9:
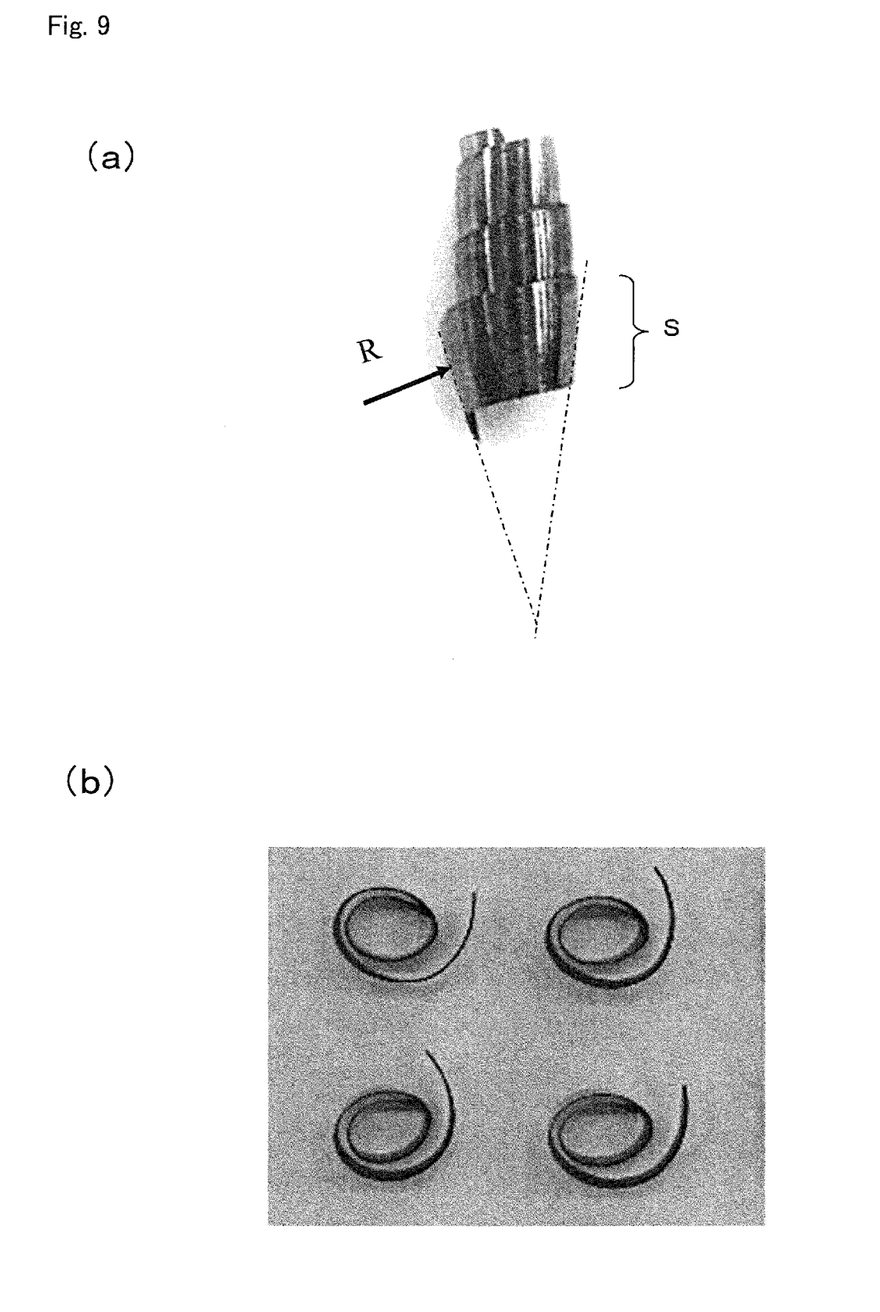

As described above, the major cutting section 512 is also configured to incline downward as the straight line L connecting both ends thereof departs from the flat cutting edge 52. This inclination facilitates helical extension of the chips. Referring to FIG. 9, in a rotating body S corresponding to one full rotation of a chip, the diameter of the end portion thereof is small, and another rotating body corresponding to the subsequent full rotation is overlapped at the small diameter portion. Hence, the helical body of the chip is less susceptible to diameter enlargement, namely, the helical body is less susceptible to an increase in its radial dimension. The inclination angle of the straight line L with respect to the lower surface may be set taking into consideration the inclination of a pocket of the holder attached, the insert strength, and the like. For example, it is preferably about 5-20° with respect to the lower surface 3.

The major cutting section 512 includes a valley portion 512L located at the lowermost position, and a top portion 512H located at the uppermost position in a side view. The valley portion 512L is located at a position in which the distance between the lower surface 3 and the major cutting section 512 is a minimum. On the other hand, the top portion 512H is located at a position in which the distance between the lower surface 3 and the major cutting section 512 is a maximum. Both the valley portion 512L and the top portion 512H may be a point or line with a certain width.

In the present embodiment, the valley portion 512L is located at a position away from the corresponding flat cutting edge 52 than the center of the major cutting section 512. The center of the major cutting section 512 corresponds to the midpoint of the distance between both ends 512a and 512b of the major cutting section 512 in a top view. In FIG. 2(b), "512M" denotes the center of the major cutting section 512. Thus, when the chip makes one full rotation while being curled, the diameter (curl diameter) of the rotating body thereof can be minimized at one end of the major cutting section 512 (the end portion close to the corresponding flat cutting edge). Consequently, the helical body of the chip is less susceptible to diameter enlargement, thereby improving chip discharge performance.

The other end 512b of the major cutting section 512 is provided with a raised section 513 inclined to locate at a higher position away from the flat cutting edge 52. The raised section 513 may have either a linear shape or curved shape. However, the linear shape is preferable from the viewpoint of the aforementioned purpose. Alternatively, the raised section 513 may be formed from two linear portions. When formed from these two linear portions, namely, a first raised section and a second raised section connected to the other end 512b of the major cutting section 512, the upward inclination angle of the first raised section is preferably smaller than the upward inclination angle of the second raised section.

The flat cutting edge 52 is formed for improving the surface finish of the workpiece. In FIG. 2, the flat cutting edge 52 has a linear shape in a top view, and is inclined to locate at a higher position toward the minor cutting edge 53 (so as to depart from the lower surface 3) in a side view. Similarly to the major cutting edge 51 (the major cutting section 512), no particular limitation is imposed on the shape of the flat cutting edge 52.

The minor cutting edge 53 has a larger peripheral cutting edge angle than the major cutting edge 51 (the major cutting section 512), and is provided for assisting in the cutting by the major cutting edge 51 (the major cutting section 512), for example, in order to decrease the cutting resistance of the major cutting edge 51 (the major cutting section 512), and reduce the damage to the major cutting edge 51 (the major cutting section 512). As used herein, the term "peripheral cutting edge angle" means an inclination angle of the cutting edge with respect to the rotation axis of the holder with the cutting insert attached to the holder.

The minor cutting edge 53 may be a linear cutting edge or a curved cutting edge. In the present embodiment, the minor cutting edge 53 is connected to the major cutting edge 51. However, it is preferred that an angle θ53 formed between a plane orthogonal to the central axis of the insert 1 and the minor cutting edge 53 be smaller than an angle θ512 formed between the plane orthogonal to the central axis of the insert 1 and the major cutting edge 51 (the major cutting section 512).

The attachment screw contact portion 6 is specifically a holder attachment hole, which has a substantially cylindrical shape and is extended through the body part. The attachment screw contact portion 6 is formed for fixing the insert 1 to the holder. The insert 1 is fixed to the holder by inserting an attachment screw into the attachment screw contact portion 6 and then screwing it into the holder.

A breaker groove 7 is formed along the major cutting section 512 in the upper surface 3. The breaker groove 7 is formed for facilitating curling of the chips generated from the major cutting section 512.

The width of the breaker groove 7, namely, the distance in a direction orthogonal to the major cutting section 512 is a maximum in the position corresponding to the valley portion 512L of the major cutting section 512. The width of the breaker groove 7 is the width of a groove part contributing to chip curling operation, which is indicated by W in FIG. 2. Similarly, the depth D of the breaker groove is a maximum at the position corresponding to the valley portion 512L of the major cutting section 512.

In the present embodiment, as shown in FIG. 2(b), the major cutting section 512 has the concave shape that is indented toward the lower surface 3 in a side view, and therefore, the cross-sectional shape of the chips can be brought into such a curved shape as shown in FIG. 9(a). Furthermore, the straight line connecting both ends of the major cutting section 512 is inclined. Hence, when the chip whose cross section has the curved shape makes one full rotation while being curled, the rotating body thereof has a minimum diameter (curl diameter) at the one end of the major cutting section 512 (the end portion close to the corresponding flat cutting edge). The inclination of the straight line connecting both ends of the major cutting section 512 allows the chips to grow helically. Consequently, in the chip helical body, the chips grow overlappingly at the portion having the small curl diameter, thereby reducing the diameter enlargement of the helical body. Consequently, the chips are less liable to damage the workpiece or harm the insert, thereby providing excellent chip discharge performance. The mechanism of the above operation and effect can be considered as follows. That is, the thickness of the chip formed in the vicinity of one end of the major cutting section 512 is smaller than the thickness of the chip generated in the vicinity of the center of the major cutting section 512. The curl diameter of the chip generated from the portion having the small thickness is decreased by compressive stress, thus forming the chip helical body having the shape as shown in FIG. 9(a). Owing to the cutting edges 5 thus configured, each of the upper surface 2 and the lower surface 3 can be suitably used as the rake face, and all of the sides of the upper surface 2 and the lower surface 3 can be suitably used for cutting, as described above.

Second Embodiment

Figure 4:
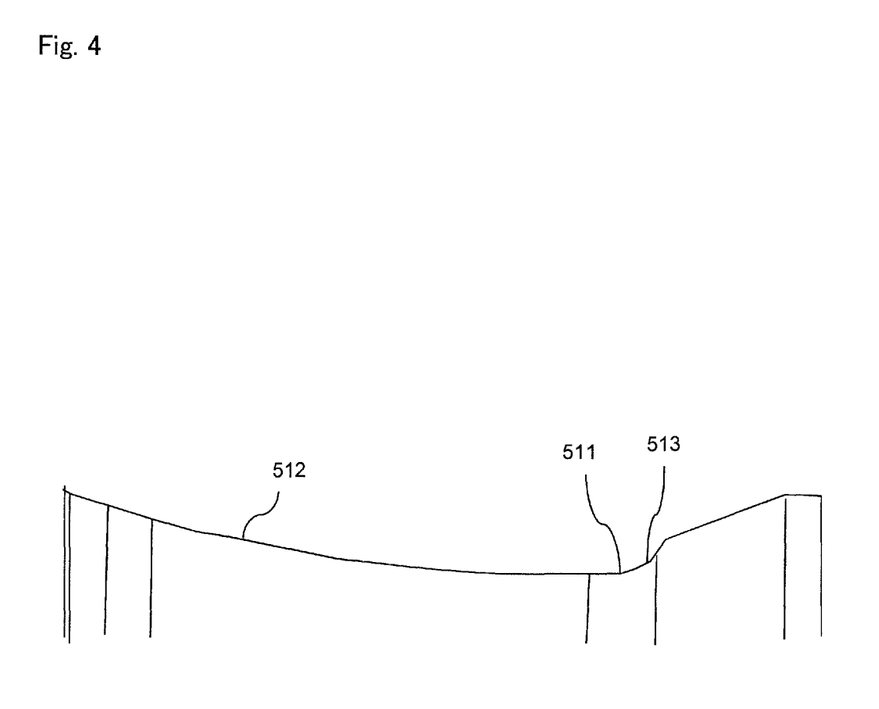
FIG. 4 is a drawing showing a cutting insert according to a second embodiment of the present invention, specifically the drawing when viewed from X direction in FIG. 2(*a*)

A cutting insert according to a second embodiment of the present invention is described in details below with reference to FIG. 4 and the like. The basic configurations are identical to those of the cutting insert of the foregoing first embodiment, and therefore the description thereof is omitted except for the following contents.

In the present embodiment, the major cutting edge 51 further includes a bent section 511 protruding outward in a top view; a major cutting section 512 which is connected to one of both ends of the bent section 511 close to the flat cutting edge 52, and is inclined to locate at a lower position away from the flat cutting edge 52 (so as to approach the lower surface 3) in a side view; and a raised section 513 which is connected to the other end of the bent section 511, and is inclined to locate at a higher position away from the flat cutting edge 52 (so as to depart from the lower surface 3) in the side view. The major cutting edge 51, particularly the major cutting section 512 is a cutting edge that plays major role in the formation of chips during cutting operation. From the viewpoint of reducing cutting resistance, a groove part for dividing the major cutting section 512 may be provided.

The bent section 511 connects between the major cutting section 512 and the raised section 513. The presence of the bent section 511 prevents the raised section 513 from being used as a cutting portion, and also achieves steady chip stability.

The raised section 513, which is inclined to depart from the lower surface 3 away from the flat cutting edge 52 in the side view, is formed on the other end 512b of the major cutting section 512, as described above. The raised section 513 may have either a linear shape or curved shape. However, the linear shape is preferable from the viewpoint of the aforementioned purpose. Alternatively, the raised section may be formed from two linear portions.

When the raised section 513 is formed from these two linear portions, namely, a first raised section and a second raised section connected to the other end 512b of the major cutting section 512, the upward inclination angle of the first raised section is preferably smaller than the upward inclination angle of the second raised section.

The major cutting section 512 and the raised section 513 are configured as follows. For example, a virtual extension line extended from the end portion close to the bent section of the major cutting section 512 in a tangential direction thereof, and a virtual extension line extended from the end portion close to the bent section of the raised section 513 in a tangential direction thereof preferably form therebetween an angle β (see FIG. 2(a)) of 165° or less, more preferably 90-165° in a top view. This configuration prevents the raised section 513 from being used as a cutting edge, thereby reducing fracture of the insert. Additionally, in the present embodiment, it is configured so that an angle formed between the major cutting section 512 and a plane orthogonal to the central axis of the insert is smaller than an angle formed between the raised section 513 and the plane orthogonal to the central axis of the insert.

The flat cutting edge 52 is formed for improving the surface finish of the workpiece. In FIG. 2, the flat cutting edge 52 has the linear shape in a top view, and is inclined to depart from the lower surface 3 in a side view. Similarly to the major cutting edge 51 (the major cutting section 512), no particular limitation is imposed on the shape of the flat cutting edge 52.

Furthermore, in the present embodiment, the major cutting section 512 and the flat cutting edge 52 are configured so that an angle formed between the plane orthogonal to the central axis of the insert and the major cutting section 512 is smaller than an angle formed between the plane orthogonal to the central axis of the insert and the flat cutting edge 52.

The minor cutting edge 53 may be a linear cutting edge or a curved cutting edge. In the present embodiment, the minor cutting edge 53 is connected to the major cutting section 512. However, it is preferred that an angle θ53 formed between the plane orthogonal to the central axis of the insert and the minor cutting edge 53 be smaller than an angle θ512 formed between the plane orthogonal to the central axis of the insert and the major cutting section 512.

In the present embodiment, as shown in FIG. 2(b), the major cutting section 512 has the concave shape that is indented toward the lower surface 3 in the side view. This makes it possible to obtain a similar effect to the foregoing first embodiment. Further, the bent section protruding outward in the top view is disposed between the major cutting section 512 inclined downward and the raised section 513 inclined upward away from the flat cutting edge. It is therefore capable of preventing the chip discharge performance from becoming unstable due to a sharp change of axial rake, by preventing the raised section 513 from being used for cutting, while decreasing the cutting resistance of the major cutting section 512. Additionally, fracture resistance can be sufficiently ensured by preventing the major cutting section 512 and the raised section 513 from protruding outward.

Third Embodiment

Figure 5:
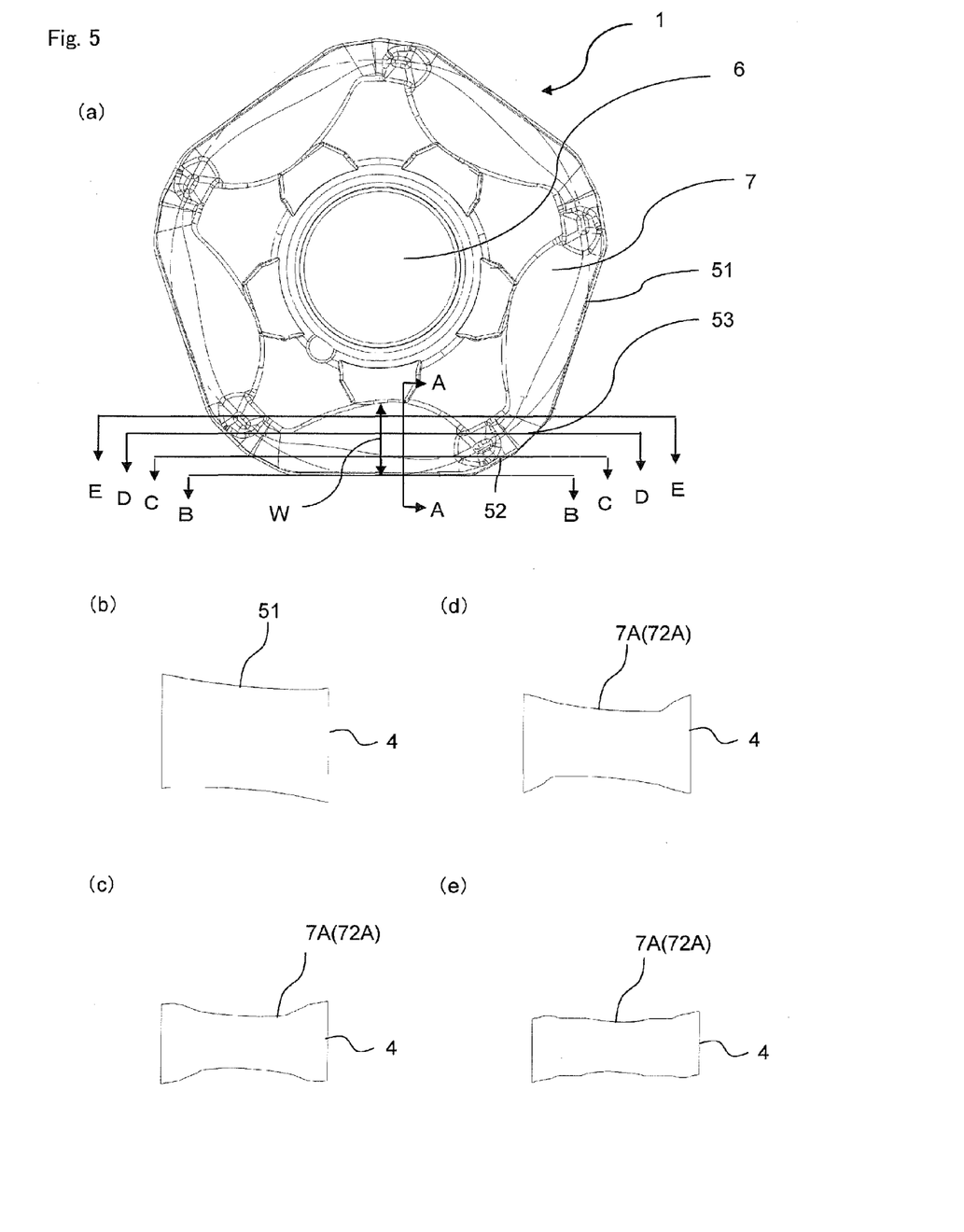

A cutting insert according to a third embodiment of the present invention is described in details below with reference to FIG. 5 and the like. The basic configurations are identical to those of the cutting insert of the foregoing first embodiment, and therefore the description thereof is omitted except for the following contents.

In the present embodiment, as shown in FIGS. 5(c) to 5(e), a breaker groove 7 has a concave shape in a sectional view parallel to the major cutting section 512, and at least partially includes a curved portion 7A. The curved portion 7A preferably has an arc shape.

Specifically, as shown in FIG. 5(a), the breaker groove 7 includes a rake face 71 that becomes closer to the lower surface 3 away from the major cutting section 512; a raised face 72 inclined upward away from the major cutting section 512; and a bottom portion 73 located between the rake face 71 and the raised face 72. The rake face 71, the raised face 72, and the bottom portion 73 also have a concave shape in the sectional view parallel to the major cutting section 512, as shown in FIGS. 5(c) to 5(e), and at least partially include a curved portion.

The curvature of the curved portion of the rake face 71 (a rake face curved portion) 71A preferably increases away from the major cutting section 512. This makes it possible to gradually reduce right and left swings during the passage of concave shaped chips generated from the major cutting section 512, thereby stably discharging the chips. The curvature of the rake face curved portion 71A is preferably larger than the curvature of the major cutting edge curved portion. Thereby, the concave shaped chips generated from the major cutting section 512 can be surely fed to the rake face.

The curvature of the curved portion of a raised face 72 (a raised face curved portion) 72A preferably increases away from the major cutting section 512. This makes it possible to gradually reduce the right and left swings during the passage of the concave shaped chips generated from the major cutting section 512, thereby stably discharging the chips. The curvature of the raised face curved portion 72A is preferably larger than the curvature of the major cutting edge curved portion. Thereby, the concave shaped chips generated from the major cutting section 512 can be surely fed to the raised face after passing through the rake face.

The rake face curved portion 71A and the raised face curved portion 72A are continuous with each other (a breaker groove curved portion 7A) in a direction away from the major cutting section 512. The curvature of the breaker groove curved portion 7A preferably increases away from the major cutting section 512. In the present embodiment, for example, as shown in FIGS. 5(c) to 5(e), the curved portions (the major cutting edge curved portion 7A, the rake face curved portion 71A, and the raised face curved portion 72A) increase away from the major cutting section 512.

In the present embodiment, as shown in FIG. 2(b), the major cutting section 512 has the concave shape that is indented toward the lower surface 3 in the side view. This makes it possible to obtain a similar effect to the foregoing first embodiment. Furthermore, the breaker groove formed along the major cutting section 512 includes the raised face has the concave shape that is indented toward the lower surface 3 in the sectional view parallel to the major cutting section 512. Therefore, compared to the flat raised face, it is capable of reducing the right and left swings of the chips generated by the concave shaped major cutting section 512 with respect to the direction of passage, thereby achieving stable chip discharge performance.

<Cutting Tool>

Figure 6:
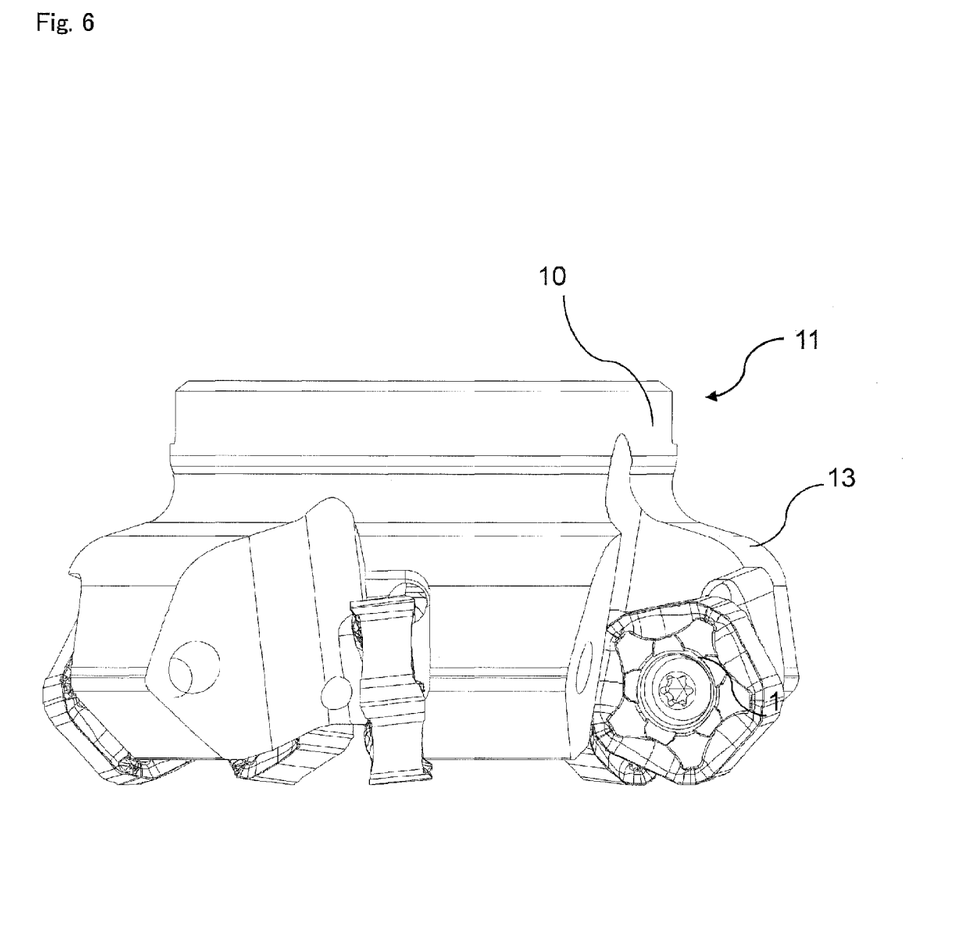
FIG. 6 is a side view showing a cutting tool according to an embodiment of the present invention.

FIG. 6 is a general side view of a cutting tool 11 with the insert 1 according to the embodiment of the present invention attached to the holder 10. A plurality of chip pockets 13 are formed in the peripheral edge portion of the holder 10. The insert 1 is attached to the outer peripheral position in each of these chip pockets 13. Specifically, the insert 1 is attached so that the major cutting edge 51 (the major cutting section 512) is located at the outermost periphery with the upper surface (the rake face) 2 facing the direction of rotation. In the cutting tool 11, the major cutting edge 51 (the major cutting section 512) performs cutting by rotating the holder 10.

Referring to FIG. 7, the insert 1 that is the negative-type insert is attached to the holder with a negative axial rake of approximately 6° in a side view. Even in this case, the major cutting section 512 has a positive axial rake with respect to the rotation axis of the holder.

<Method of Manufacturing Machined Product>

The method of manufacturing a machined product according to an embodiment includes the step of rotating the cutting tool; and the step of bringing the cutting edge of the rotating cutting tool into contact with the surface of a workpiece. Specific steps are described below.

Firstly, the insert 1 is attached to the holder 10. On this occasion, the insert 1 is attached to an attachment part of the holder 10 along the same circumference of the holder 10. As an example of attachment method, a screw is inserted into the attachment screw contact portion 6 (the screw hole) formed at a mid-portion on the upper surface 21 that is the flank face of the insert 1.

Figure 8:
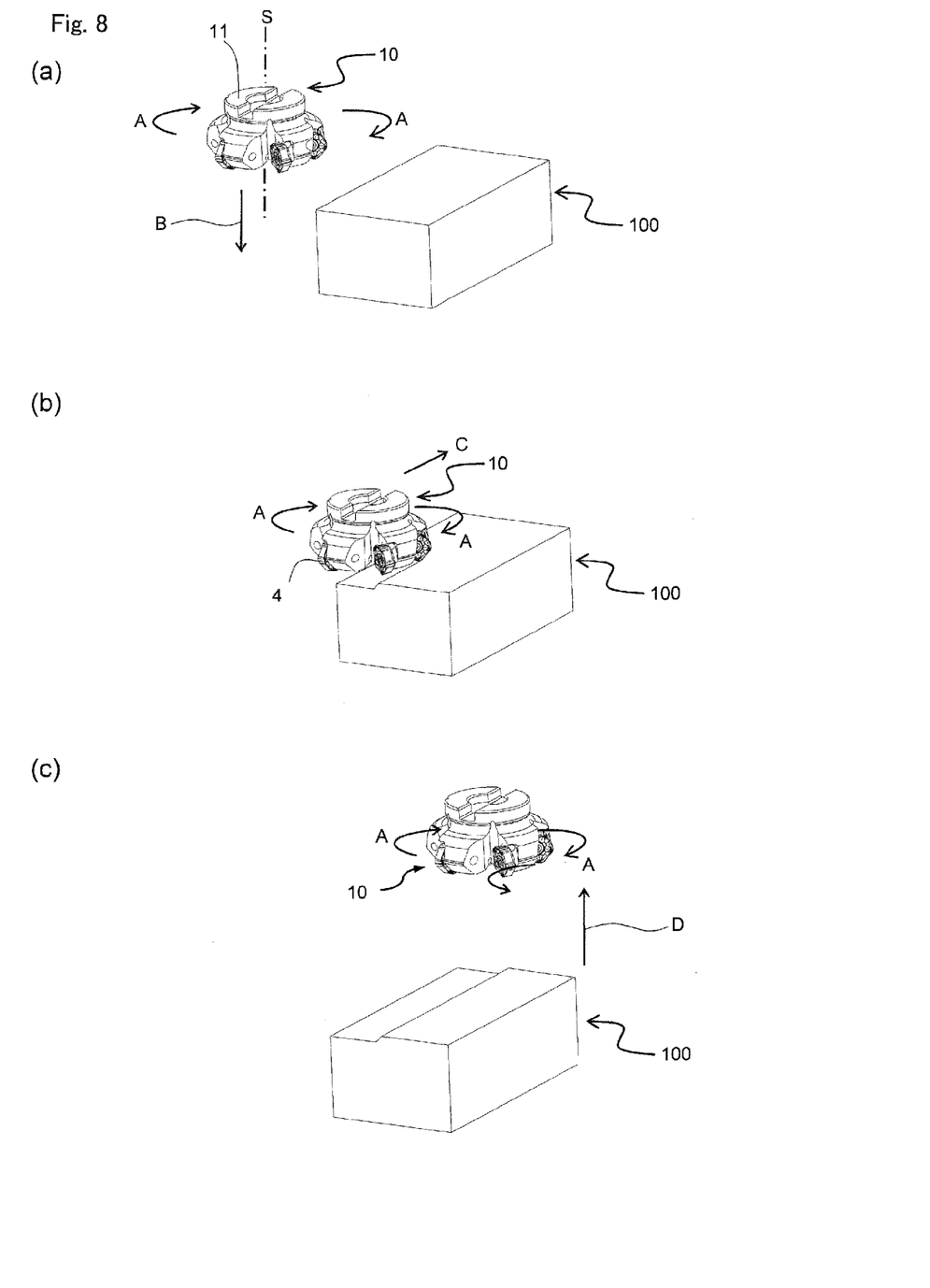
FIG. 8 is a process drawing for explaining a method of manufacturing a machined product according to an embodiment of the present invention.

Subsequently, after the insert 1 is attached to the holder 10, as shown in FIG. 8(a), this is rotated around an axis S of the holder 10 in the direction of arrow A. Then, the cutting edge is brought near the workpiece 100 by moving the cutting tool 11 in the direction of arrow B.

The surface of the workpiece 100 is cut by bringing the cutting edge of the insert 1 into contact with the surface of the workpiece 100, and by moving the cutting tool 11 in the direction of arrow C, as shown in FIG. 8(b). For example, the cutting tool 11 can proceed cutting in substantially parallel along the surface of the workpiece 100.

Thereafter, as shown in FIG. 8(c), the cutting tool 11 is separated from the workpiece 100 by moving the cutting tool 11 in the direction of arrow D. When the cutting is continued, the step of bringing the cutting edge 5 of the cutting tool 11 into contact with different portions of the workpiece 100 may be repeated while retaining the rotation of the cutting tool 11.

When the cutting edge in use is worn, an unused edge may be used therefor by rotating the insert 1 around the central axis of the through hole.

While the several embodiments according to the present invention have been described and illustrated above, it is to be understood that the present invention is not limited to these embodiments and is applicable to any optional embodiments without departing from the gist of the present invention.

EXAMPLES

The effect of the cutting insert according to the foregoing first embodiment was evaluated as follows.

Example 1

Figure 2:
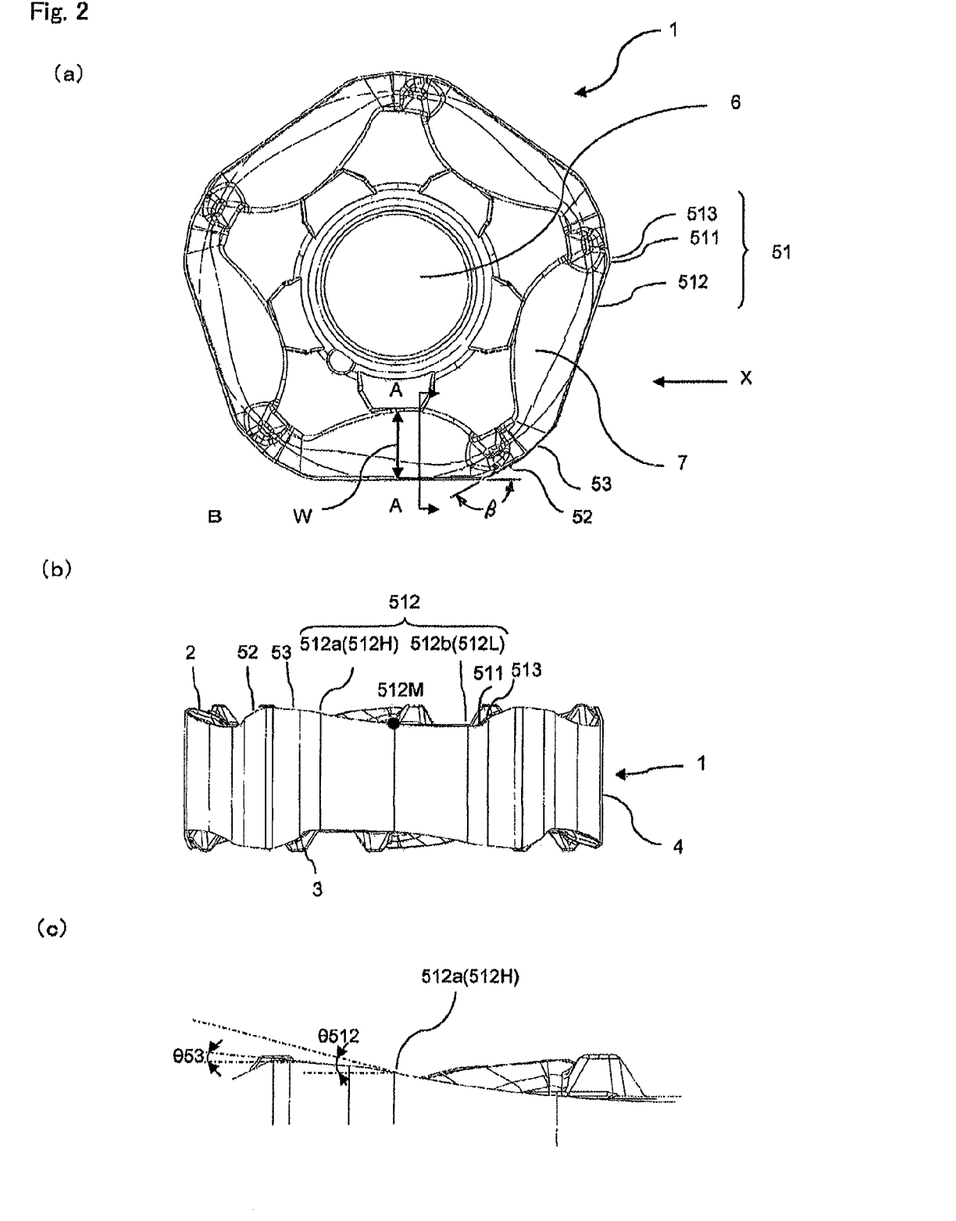
Figure 3:
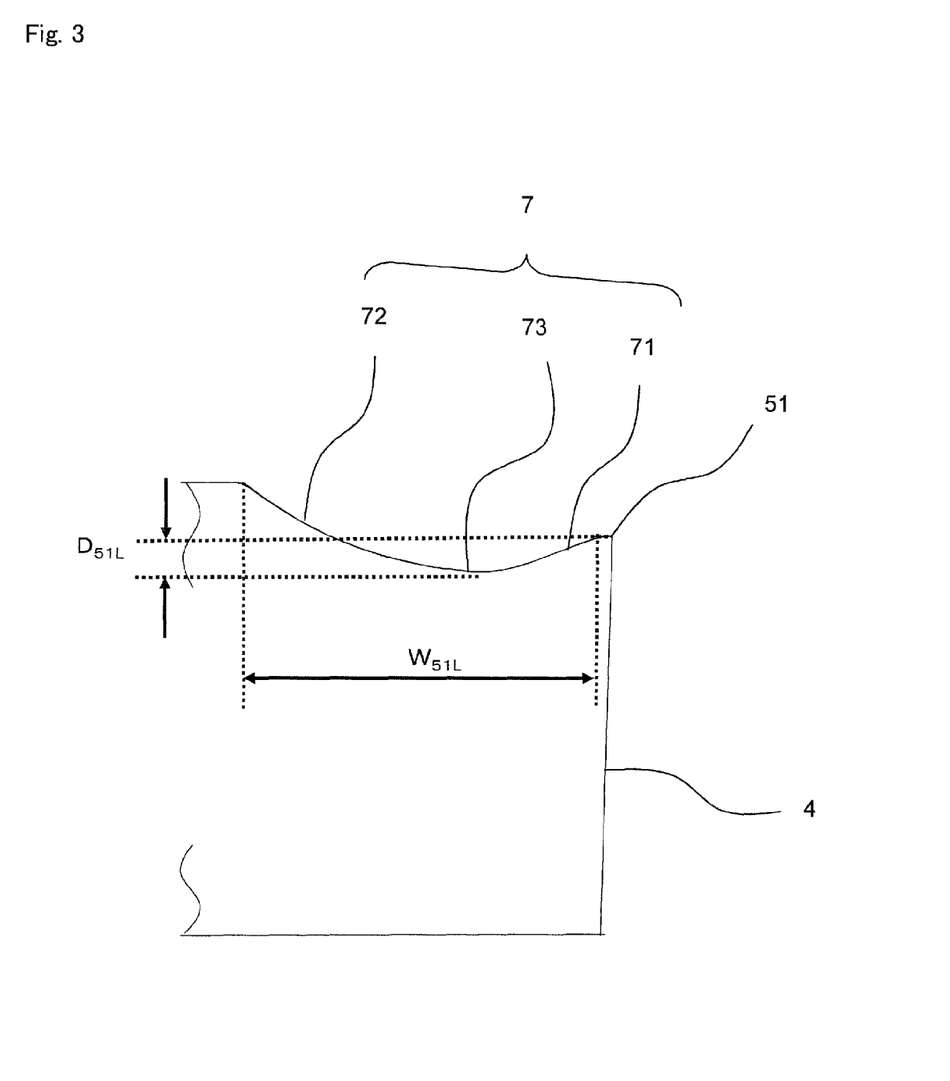
FIG. 3 is a drawing showing a cutting insert according to a first embodiment of the present invention, specifically a sectional view taken along the line A-A of FIG. 2(*a*)

Under the condition that a feed per stroke for each cutting edge was 0.2 mm/t, and the axial depth of cut of the cutting tool was 3.0 mm, cutting was carried out by using the cutting tool with the cutting insert according to the first embodiment as shown in FIGS. 1 to 3. Each chip had such a superior shape as shown in FIG. 9(a). The chip discharge performance thereof was also excellent.

Cutting was carried out in the same manner as in Example 1, except that the feed per stroke for each cutting edge was 0.3 mm/t. Even under this condition, each chip had such a superior shape as shown in FIG. 9(a). The chip discharge performance thereof was also excellent.

Comparative Examples 1 and 2

Cutting was carried out in the same manner as in Example 1 or 2, except for using the cutting tool with the negative-type insert whose cutting edges are formed along a straight line connecting both ends of a major cutting section. In either case, the chips having such a shape as shown in FIG. 9(b) were obtained. These chips have a larger curl diameter than the foregoing example, and the curl diameter thereof increased as the chip became longer. The chip discharge performance thereof was poor.

DESCRIPTION OF REFERENCE NUMERALS 1 cutting insert
2 upper surface
3 lower surface
4 side surface
5 cutting edge
51 major cutting edge
511 bent section
512 major cutting section
513 raised section
52 flat cutting edge
53 minor cutting edge
6 attachment screw contact portion (screw hole)
7 breaker groove
71 rake face
72 raised face
73 bottom portion
10 holder
11 cutting tool

The invention claimed is:

1. A cutting insert, comprising:
an upper surface;
a lower surface;
a side surface connected to the upper surface and the lower surface; and
a cutting edge which is located at an intersection of the upper surface and the side surface, and comprises a flat cutting edge, a minor cutting edge connected to the flat cutting edge, and a major cutting edge connected to the flat cutting edge by the minor cutting edge,
wherein the major cutting edge comprises
a major cutting section which, in a side view, has a concave shape, and is inclined downward as the major cutting section extends further away from the minor cutting edge,
the major cutting section comprises a curved portion having a curved shape in a side view,
the curved portion has a radius of curvature that is larger as the curved portion extends further away from the minor cutting edge.

2. The cutting insert according to claim 1, wherein the major cutting section has a linear shape in a side view, and further comprises a linear portion connected to the curved portion.

3. The cutting insert according to claim 1, wherein the major cutting section comprises a valley portion located at a lowermost position, which is further away from the minor cutting edge than a center of the major cutting section in a side view.

4. The cutting insert according to claim 1, wherein the major cutting edge further comprises
a raised section, in a side view, which is inclined upward as the raised section is further away from the minor cutting edge, and is at an end portion of the major cutting section further from the minor cutting edge.

5. The cutting insert according to claim 4, wherein the raised section comprises a first raised section having a linear shape and connected to the major cutting section, and a second raised section having a linear shape and an upward inclination angle larger than the first raised section.

6. The cutting insert according to claim 4, wherein the major cutting edge further comprises, between the major cutting section and the raised section, a bent section projecting toward a direction away from a center of the upper surface in a top view.

7. The cutting insert according to claim 6, wherein a virtual extension line of the major cutting section extended from an end portion thereof closer to the bent section in a tangential direction thereof, and a virtual extension line of the raised section extended from an end portion thereof closer to the bent section in a tangential direction thereof form an angle of 165° or less in a top view.

8. The cutting insert according to claim 6, wherein the flat cutting edge is inclined upward as the flat cutting edge approaching the minor cutting edge in a side view.

9. The cutting insert according to claim 8, wherein an angle of a plane perpendicular to a central axis of the cutting insert and the major cutting section is smaller than an angle of the plane and the flat cutting edge.

10. The cutting insert according to claim 1, wherein
the upper surface comprises a breaker groove located along the major cutting section, and
the breaker groove comprises a raised face which is inclined upward as the raised face is further away from the major cutting section, and has a concave shape in a sectional view parallel to the major cutting section.

11. The cutting insert according to claim 10, wherein
the major cutting section comprises a major cutting edge curved portion having a curved shape in a side view,
the raised face comprises a raised face curved portion having a curved shape in a sectional view parallel to the major cutting section, and
a curvature of the raised face curved portion is larger than a curvature of the major cutting edge curved portion.

12. The cutting insert according to claim 10, wherein the raised face comprises a raised face curved portion having a curved shape in a sectional view parallel to the major cutting section, and a curvature of the raised face curved portion increases as the raised face curved portion is further away from the major cutting section.

13. The cutting insert according to claim 12, wherein the breaker groove further comprises
a rake face which is inclined downward as the rake face is further away from the major cutting section, and has a concave shape in the sectional view parallel to the major cutting section.

14. The cutting insert according to claim 13, wherein
the major cutting section comprises a major cutting edge curved portion having a curved shape in a side view,
the rake face comprises a rake face curved portion having a curved shape in the sectional view parallel to the major cutting section, and
a curvature of the rake face curved portion is larger than a curvature of the major cutting edge curved portion.

15. The cutting insert according to claim 13, wherein
the rake face comprises a rake face curved portion having a curved shape in the sectional view parallel to the major cutting section, and
a curvature of the rake face curved portion increases as the rake face curved portion is further away from the major cutting section.

16. The cutting insert according to claim 14, wherein
the rake face curved portion and the raised face curved portion are continuous with each other in a direction away from the major cutting section to configure a breaker groove curved portion, and
a curvature of the breaker groove curved portion increases as the breaker groove curved portion is further away from the major cutting section.

17. A cutting tool, comprising:
a cutting insert according to claim 1; and
a holder configured to attach the cutting insert thereto.

18. The cutting tool according to claim 17, wherein the cutting insert is attached to the holder so that a straight line connecting both ends of the major cutting section has a positive axial rake with respect to a rotation axis of the holder.

19. A method of manufacturing a machined product, comprising:
rotating a cutting tool according to claim 17; and
bringing the cutting edge of the rotating cutting tool into contact with a surface of a workpiece.

* * * * *